United States Patent [19]

Friedman et al.

[11] 4,429,897
[45] Feb. 7, 1984

[54] VARIABLE TERRAIN DOLLY

[76] Inventors: Donald M. Friedman, 8 Glenwood Dr., Hauppauge, N.Y. 11788; Fred M. Monner, 21 Pimlico Dr., Commack, N.Y. 11725

[21] Appl. No.: 346,016

[22] Filed: Feb. 5, 1982

[51] Int. Cl.³ .............................................. B62B 1/12
[52] U.S. Cl. ................................ 280/646; 280/47.24; 280/47.37 R; 280/655; 280/659
[58] Field of Search ............ 280/646, 655, 659, 47.19, 280/47.28, 47.37 R, DIG. 6

[56] References Cited

U.S. PATENT DOCUMENTS

| | | | |
|---|---|---|---|
| 2,582,435 | 1/1952 | Howard | 280/654 |
| 2,881,925 | 4/1959 | Idoux | 280/DIG. 6 |
| 2,885,215 | 5/1959 | Williamson | 280/DIG. 6 |
| 2,957,700 | 10/1960 | Beaurline | 280/DIG. 6 |
| 2,995,275 | 2/1946 | Jackson | 280/655 |
| 3,677,571 | 7/1972 | Maturo, Jr. et al. | 280/654 |
| 3,997,181 | 12/1976 | Jaco et al. | 280/47.26 |
| 4,040,642 | 8/1977 | David | 280/654 |
| 4,142,736 | 3/1979 | Ackerfeldt et al. | 280/652 |
| 4,268,050 | 5/1981 | Kennedy, Sr. | 280/47.19 |

FOREIGN PATENT DOCUMENTS 536328  1/1957  Canada .................................. 280/38

*Primary Examiner*—David M. Mitchell
*Attorney, Agent, or Firm*—Leonard Belkin

[57] ABSTRACT

A variable terrain dolly especially useful for carrying loads over sandy and rocky beach surfaces and adjustable for use in other environments. The dolly has a chassis consisting of an elongated tubular member with a load suporting member at the bottom and a slidable, transversely extending back at the other end with a swiveled handle. A foldable shelf is also provided and a pair of wheels pivoted from a point on the chassis between the shelf and the load supporting members. The wheels are over sized, have wide treads, and are adjustable over a range of positions.

5 Claims, 8 Drawing Figures

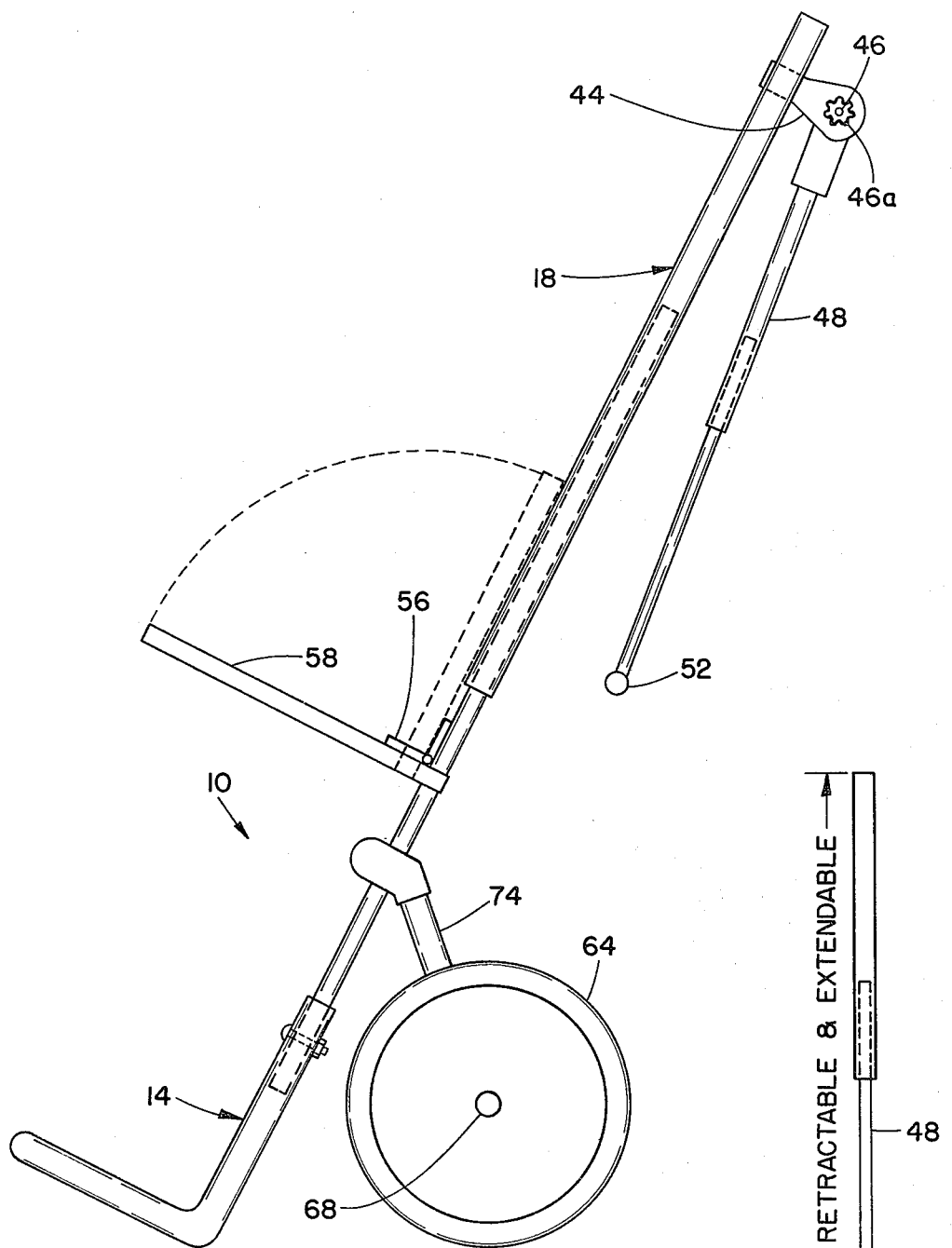
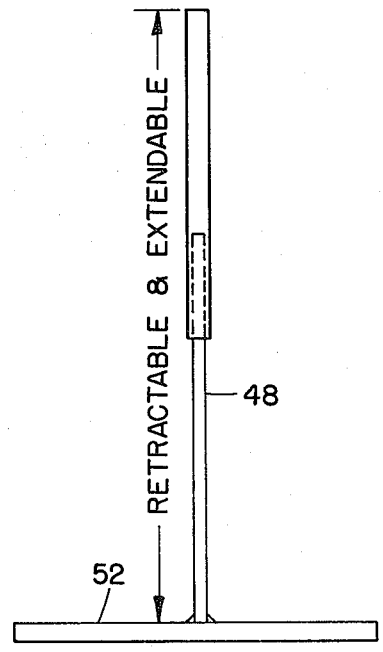
FIG.2
FIG.2a

VARIABLE TERRAIN DOLLY

BACKGROUND OF THE INVENTION

The present invention relates to a variable terrain dolly which is especially useful to transport a heavy load over a sandy surface such as at a beach and useful as well on other kinds of terrain.

There are available today a vast array of dollies and carts which are useful for certain specific applications. For example, U.S. Pat. No. 2,881,925 shows a cart which employs a relatively high chassis for supporting golf clubs but would be awkward to use in a sandy environment or in a location where it is necessary to move a load up and down stairs and over obstacles.

In U.S. Pat. No. 2,582,435, there is disclosed a carrier designed for use by a mailman but this device would not function well on other than good pavement. The collapsible luggage carrier of U.S. Pat. No. 4,040,642 is useful in confined quarters where flooring surfaces are relatively smooth and flat and there is no problem of toppling. Other carts and the like designed for specific applications are shown in U.S. Pat. Nos. 3,997,181, 2,786,692, 4,142,736 and 3,677,571, the latter disclosing a beach cart. This cart is difficult to use as the roller employed on which the main chassis is pivoted appears to increase the "drag" or friction associated with beach conditions.

All of the devices disclosed in the aforementioned patents are difficult to use in situations other than those for which they are particularly designed, and, in fact, a feature which enhances a cart's usefulness in a particular application can be a serious drawback in other situations. For example, a narrow wheel track and low axle are very useful in luggage carriers where there is limited space and where the floors are even and flat. Such construction would not be suitable on uneven terrain or where greater road clearance is required.

SUMMARY OF THE PRESENT INVENTION

The present invention overcomes or minimizes many of the problems mentioned above by providing a cart or a dolly which is especially useful for carrying supplies across a sandy beach and at the same time is highly adaptable for use in a variety of other environments.

In accordance with the principles of this invention, a preferred embodiment of this invention comprises a dolly having a chassis which consists of an elongated tubular member with a load supporting member at the bottom, an extensible back at the other end, a foldable shelf for supporting an additional load, and a pair of wheels pivoted from a point on the chassis between the shelf and the load supporting member. The wheels are mounted on the ends of arms extending outwardly and forwardly of the pivot point, forming an angle no greater than 45 degrees with the tubular member. The wheels are oversize to facilitate movement over sand and rough surfaces and there is provided an extension handle swiveled from the back to permit easier pulling of the cart when loaded.

When properly loaded, the card is balanced around the pivot point for the wheels so that the user does not support any of the load. The chassis may be tilted to any convenient angle, including the horizontal position which is especially useful on a beach. The swiveled handle makes it convenient to pull the cart, the oversized wheels reduce the effort required to go over obstacles, and the sharp angle of the arms supporting the wheels facilitates movement over obstacles.

It is thus a principal object of this invention to provide a variable terrain utility cart or dolly which has special usefulness on rough pavement or a sandy beach, and yet is of simple construction, light in weight, and economical to construct.

Other objects and advantages of this invention will hereinafter become obvious from the following detailed description of a preferred embodiment of this invention.

BRIEF DESCRIPTION OF THE DRAWINGS

FIG. 2 is a side view of the cart shown in FIG. 1.

FIG. 2a is a back view of the extensible handle shown in FIG. 2.

DESCRIPTION OF THE PREFERRED EMBODIMENT

Figure 1:
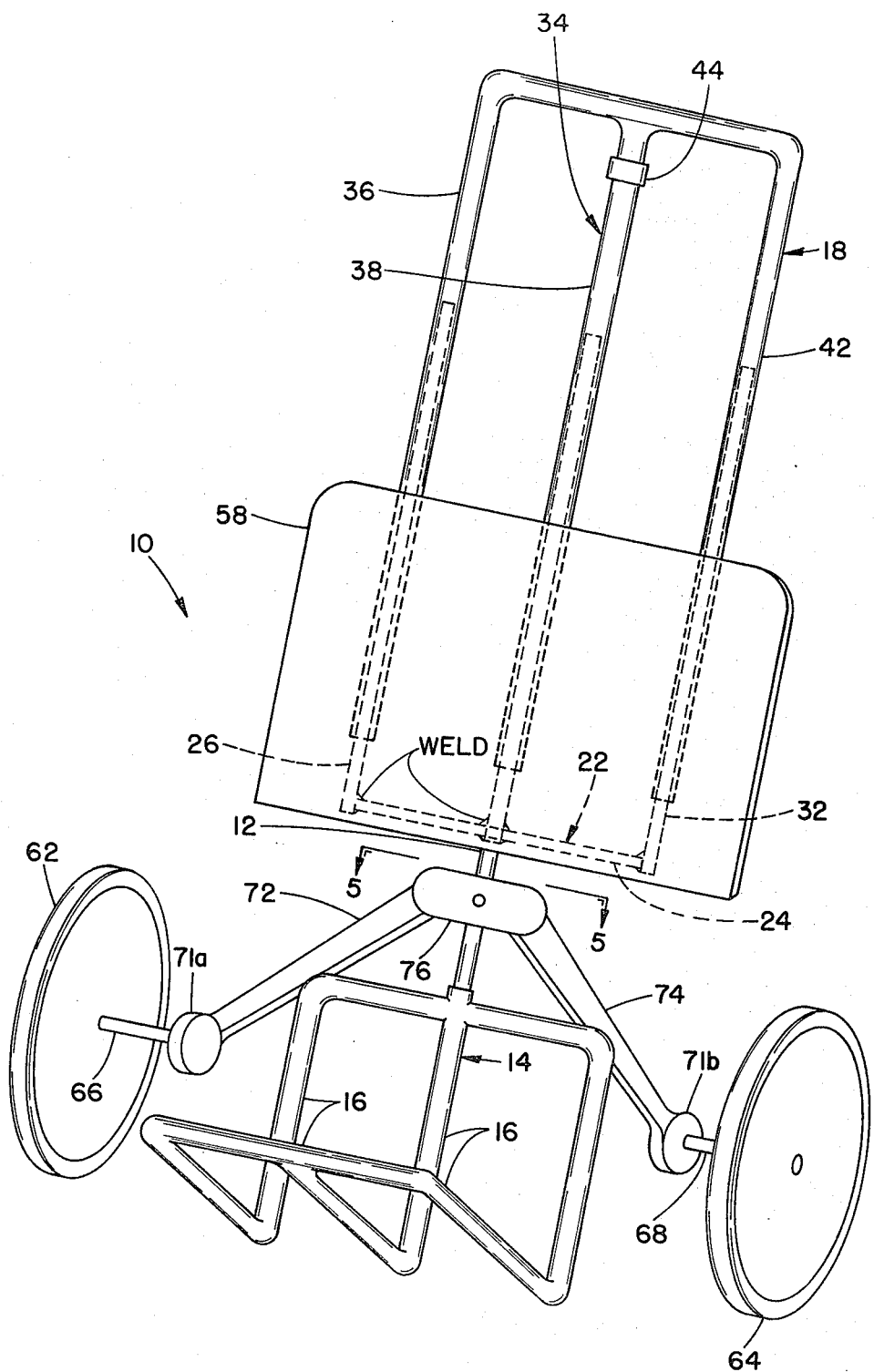
FIG. 1 is an isometric view, partially schematically, of a preferred embodiment of this invention.
Figure 3:
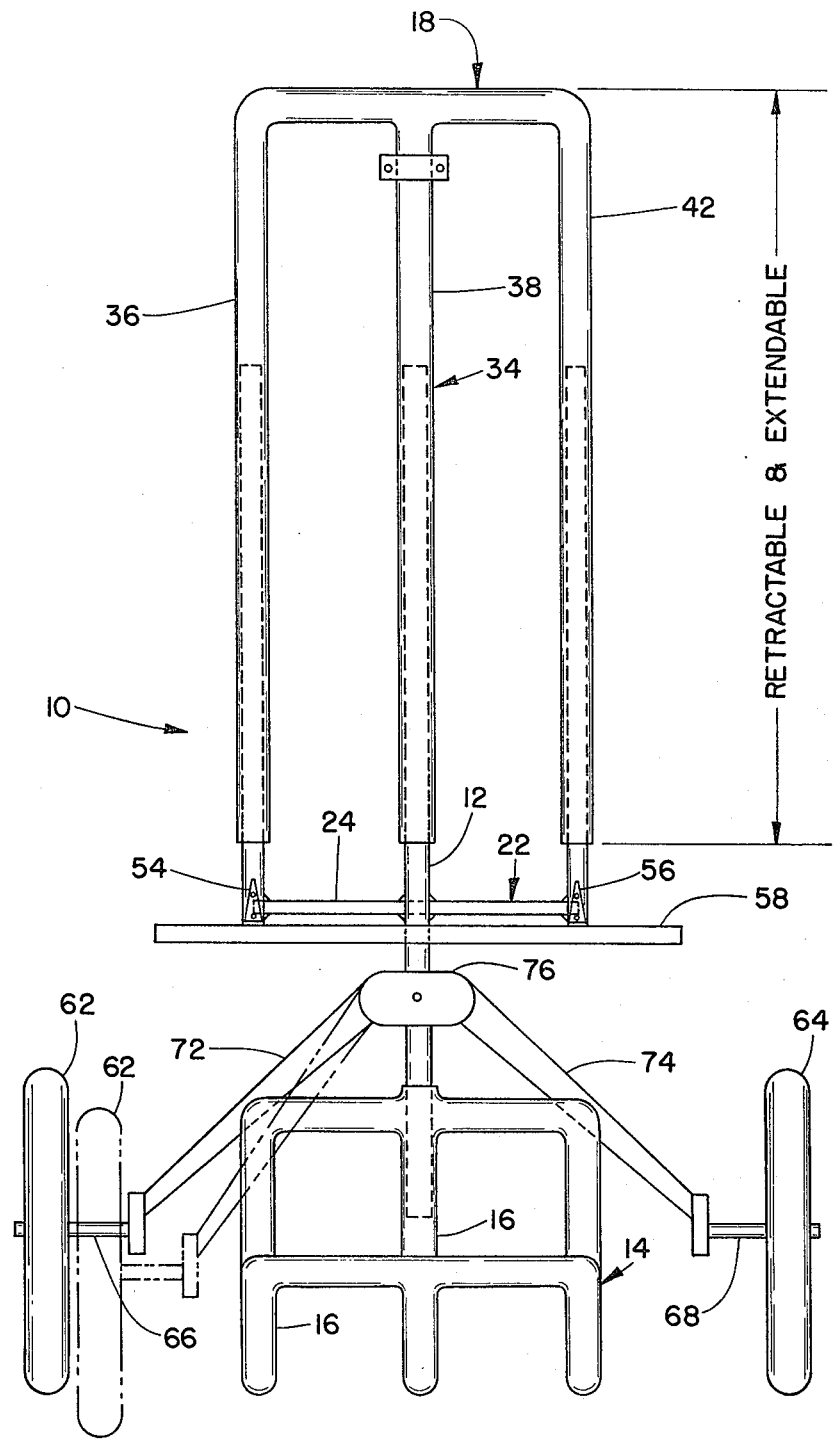
FIG. 3 is a front view of the cart shown in FIG. 2.

Referring to FIGS. 1-6, there is illustrated a cart or dolly 10 having a chassis consisting of a chassis tubular member 12 supporting at its lower end a load supporting platform 14. The latter is constructed of tubular elements 16 bent into an L-shape as illustrated and fitted on to the lower end of tubular member 12.

The upper end of tubular member 12 supports a back 18 consisting of a rigid structure 22 having a transverse bar 24 rigidly attached to member 12 on which two arms or fingers 26 and 32 extend. The slidable portion 34 of back 18 consists of three tubular arms 36, 38, and 42 which slide over arm 26, tubular member 12, and arm 32, respectively. If desired, a latch or stop of conventional design may be employed to hold slidable portion 34 of back 18 at the position selected.

Figure 4:
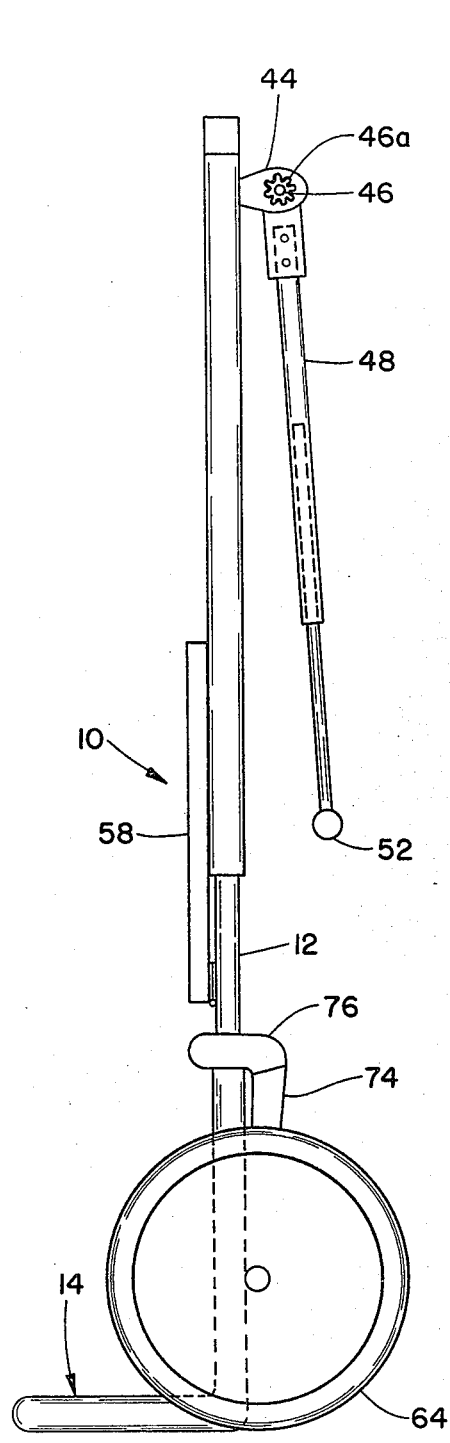
FIG. 4 is a side view of the cart of FIG. 2 in its stowage or alternate use position.

On arm 34 is a bracket 44 with a pin 46 on which is pivoted an extensible member or arm 48 terminating in a handle 52. When member 48 is employed to pull cart 10, it is rotated counterclockwise so that it becomes an extension of back 18, and with tubular member 12 at or near horizontal, cart 10 can be conveniently pulled by handle 52. As shown in FIGS. 2 and 4, member 48 can be folded out of the way when not in use. Member 48 is shown more clearly in FIG. 2a. A knurled nut 46a may be employed on pin 46 to lock arm 48 in the most convenient position of arm 48 for use and any conventional means may be employed to lock expansible arm 48 in its tube.

Mounted on structure 22 are a pair of hinges 54 and 56 for holding a shelf 58, which, as illustrated in FIG. 2, is pivoted between a retracted position against back 18 when not in use and a fully open position when a load is to be carried.

Cart 10 is provided with a pair of wheels 62 and 64 carried on axles 66 and 68, respectively, which in turn are supported by universal joints 71a and 71b of conventional design at the ends of arms 72 and 74 which extend transversely from a bracket assembly 76 mounted on tubular member 12 at a point just below and adjacent shelf 58. Axles 66 and 68 are maintained at a constant orientation by joints 71a and 71b as arms 72 and 74 are adjusted as described below.

As best seen in FIG. 2, arms 72 and 74 lie in a common plane which is at an angle with tubular member 12, measured from the bottom thereof, not in excess of 45 degrees, for reasons to be more fully explained later. The angle illustrated is the maximum angle (ie, 45 degrees), as bracket assembly 76 is designed to permit the selection of any one of three angles up to 45 degrees, starting from the fully retracted position for stowage or alternate use, shown in FIG. 4, an intermediate position shown in phantom in FIG. 3, and the maximum angle shown in FIG. 2.

The position of arms 72 and 74 shown in FIG. 2 renders cart 10 useful in particularly rough terrain such as sandy or rocky beaches where there are obstacles to be overcome. The use of oversized wheels 62 and 64, whose diameter is in excess of one-half the distance between he bottom of platform 14 and shelf 58 in its open position, insures adequate leverage to pull cart 10 over such obstacles. In addition, the high pivot point represented by the location of bracket assembly 76 with arms 72 and 74 spreading downwardly and outwardly therefrom avoids the use of an axle connecting wheels 62 and 64, which axle could be caught on an obstacle. The wide spread of wheels 62 and 64 reduces the possibility of toppling where the terrain is uneven. Wheels 62 and 64 are of conventional construction, solid metal with rubber tires, but with tread of at least two inches in width.

Figure 5:
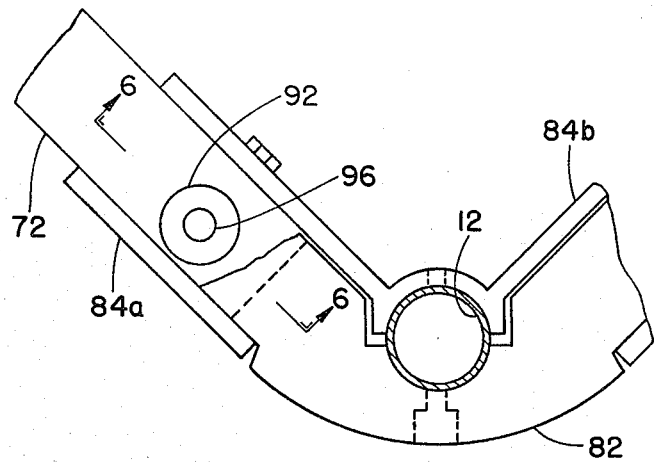
FIG. 5 is a view along 5—5 of FIG. 1.
Figure 6:
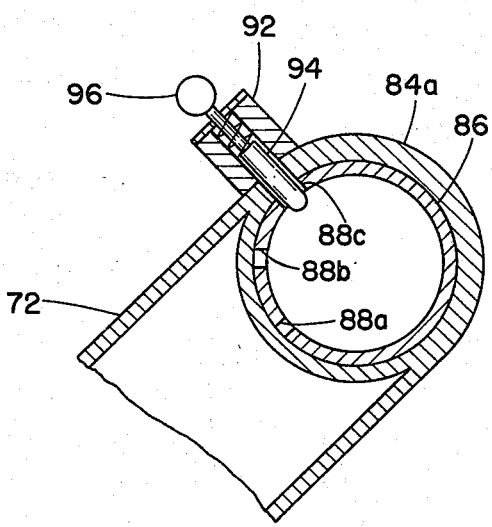
FIG. 6 is a section along 6—6 of FIG. 5.

For details of bracket assembly 76, reference is made to FIGS. 5 and 6. Assembly 76 consists of a bent tubular member 82 bolted to chassis tubular member 12, on the ends of which are identical pivot assemblies 84a and 84b in mirror image of each other for supporting arms 72 and 74, respectively.

Within pivot assembly 84a is a hollow shaft 86 around which arm 72 pivots. Shaft 86 is provided with three openings, 88a, 88b, and 88c. Arm 72 has a boss 92 supporting a spring biased plunger 94 with a spherical knob 96 for lifting plunger 94. The purpose of the latter is to lock the position of arm 72 in any one of the three positions represented by openings 88a, 88b, and 88c. With plunger 94 in opening 88c, arm 72 is in the position shown in FIG. 2 (maximum angle, 45 degrees), and opening 88a represents the stowage or alternative position, while opening 88b is the intermediate position. Knob 96 is used to raise plunger 94 when wheel position is to be changed.

It should be noted that pivot assemblies 84a and 84b are oriented so that in the maximum angle of 45 degrees, wheel 62 and 64 have the widest distance between them. At the intermediate position, the angle with chassis tubular element 12 is not only smaller, but the wheels are somewhat closer together, and in the stowage position, the wheels are against the body of dolly 10 for convenient stowage, or alternate use, as shown in FIG. 4.

This feature permits cart 10 to be used in places where the wide spread of wheels 62 and 64 can not be conveniently accomodated, such as inside buildings, elevators and the like. In the stowage or alternate use position, dolly 10 is especially useful for the carrying of garbage cans.

The mechanical details of bracket assembly 76, which includes pivot assemblies 84a and 84b, arms 72 and 74, and joints 71a and 71b, are not a part of this invention as any mechanical arrangement may be employed as long as wheels 62 and 64 are made adjustable as described.

It will be seen that cart 10 is constructed of all tubular elements except for shelf 58 which could also be made from tubular parts, thereby making it possible to have an all metal design of high strength while at the same time being light in weight.

Figure 7:
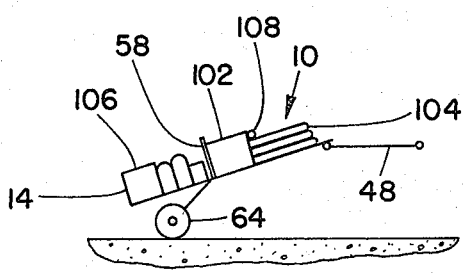
FIG. 7 is a schematic view of the dolly in beach use.

In the operation of dolly 10, for beach use, as shown in FIG. 7, shelf 58 would be opened, wheels 62 and 64 would be at their maximum angle as shown in FIG. 2, handle 48 would be rotated counterclockwise to act as an extension of back 18, and the load would be balanced around the fulcrum at bracket assembly 76. Due to the over-sized wheels and their wide tread and track, it is relatively easy to pull the fully loaded dolly over a sandy beach.

A very heavy load can be pulled conveniently and easily over a sandy or rocky beach. As seen in FIG. 7, arm 48 can be rotated to a convenient position and nut 46a locked to hold the former in place.

Typically the load might consist of a cooler 102 on shelf 58 with folding chairs 104 resting on back 18 above the cooler, food items, clothing, blankets, radios, etc. 106 on platform 104, and a beach umbrella 108.

With the load balanced about wheels 62 and 64 on platform 14 and shelf 58, arm 48 in effect has the primary function to provide leverage for the pulling, while the oversized wheels and extra wide wheel tread contributes substantially to the ease of locomotion on a sandy or rocky surface.

When the device is to be used inside where the pavement has fewer obstacles, and where the wide stance of the wheels would be at a disadvantage, the intermediate or stowage positions of the wheels would be employed, and it would not ordinarily be necessary to extend arm 48 since chassis tubular element 12 is more likely to be almost upright, as shown in FIG. 2. The over-sized wheels facilitate movement up and down stairs.

It is thus seen there has been provided a variable terrain dolly which is especially useful on surfaces normally very difficult for a vehicle to cover while at the same time being adaptable for use in other environments.

While only a preferred embodiment of the invention has been described, it is understood that many variations thereof are possible without departing from the principles of this invention.

What is claimed is:

1. A load carrying utility cart adapted for multi-terrain usage and for travel over a sandy or rocky surface, in particular, comprising:

a. a chassis comprising an elongated, tubular member with load supporting means mounted on the lower end thereof directed frontwardly and a frame of extensible tubular members mounted in a flat array on ssaid chassis for permitting an extension of the upper end thereof, said frame forming a back for said chassis to aid in the support of said load;

b. foldable shelf means mounted on said chassis adjacent the lower end of said frame, said shelf means directed frontwardly when unfolded and cooperating with said frame for support of said load;

c. pivot means located on said chassis for supporting a pair of wheels about which said chassis can be pivoted for permitting movement of said cart, said pivot means being located on said chassis at a point between said load supporting means and said shelf means, thereby permitting the balanced distribution of load about said pivot means;

d. said pivot means having arms extending rearwardly of said chassis from said pivot point, said arms being in a common plane which is at an angle with said chassis of no more than 45 degrees from the lower end of said chassis, and each of said arms directed sidewardly from said pivot means;

e. said wheels having a diameter which is in excess of one-half the distance between the lower end of said cart and the location of said pivot means, said wheels being supported at the free ends of said arms; and f. handle means pivoted on one of said extensible frame adjacent the upper end of said chassis rotatable between a position folded in against said chassis and a position extending the height of said chassis for use in pulling said cart when in use, and including means to lock said handle means in any selected position.

2. The cart of claim 1 in which the construction of said cart is substantially of tubular elements combining strength and light weight.

3. The cart of claim 2 in which said pivot means includes means to render said arms adjustable between a zero angle with said chassis for stowage or alternate use and 45 degrees for use in a sandy beach environment.

4. The cart of claim 3 in which said wheels have maximum separation when said arms are at the 45 degree angle with said chassis and said wheels are flush against said load supporting means when said arms are at said zero angle with said chassis, the tread of each said wheel having a minimum width of two inches.

5. The cart of claim 4 in which the distance between wheels is progressively less at each position of said arms when moved through successive positions from the 45 degree angle with said chassis to said stowage position.

* * * * *